(12) United States Patent
Nielsen

(10) Patent No.: US 11,234,369 B2
(45) Date of Patent: Feb. 1, 2022

(54) MOWER-CONDITIONER WITH A VARIABLE SPEED RATIO

(71) Applicant: Kverneland Group Kerteminde AS, Kerteminde (DK)

(72) Inventor: Rasmus Elmelund Nielsen, Gudbjerg (DK)

(73) Assignee: KVERNELAND GROUP KERTEMINDE AS, Kerteminde (DK)

( * ) Notice: Subject to any disclaimer, the term of this patent is extended or adjusted under 35 U.S.C. 154(b) by 169 days.

(21) Appl. No.: 16/497,824

(22) PCT Filed: Dec. 21, 2017

(86) PCT No.: PCT/EP2017/084082
§ 371 (c)(1),
(2) Date: Sep. 26, 2019

(87) PCT Pub. No.: WO2018/177582
PCT Pub. Date: Oct. 4, 2018

(65) Prior Publication Data
US 2020/0375108 A1  Dec. 3, 2020

(30) Foreign Application Priority Data
Mar. 31, 2017  (GB) .................................. 1705252

(51) Int. Cl.
*A01D 43/10* (2006.01)
*A01D 43/08* (2006.01)
*A01D 82/00* (2006.01)

(52) U.S. Cl.
CPC ......... *A01D 43/105* (2013.01); *A01D 43/085* (2013.01); *A01D 82/00* (2013.01)

(58) Field of Classification Search
CPC .... A01D 43/105; A01D 43/085; A01D 82/00; A01D 82/02
USPC ...................................................... 56/16.4 R
See application file for complete search history.

(56) References Cited

U.S. PATENT DOCUMENTS

| 3,430,505 | A | | 3/1969 | Oliva et al. |
| 4,094,132 | A | | 6/1978 | Decoene et al. |
| 5,326,320 | A | | 7/1994 | von Allwoerden |
| 5,778,647 | A | * | 7/1998 | McLean ............... A01D 34/664 |
| | | | | 56/13.6 |

(Continued)

FOREIGN PATENT DOCUMENTS

| DE | 4033879 A1 | 4/1992 |
| DE | 29903969 U1 | 6/1999 |

(Continued)

*Primary Examiner* — Alicia Torres
*Assistant Examiner* — Matthew Ian Neal
(74) *Attorney, Agent, or Firm* — Steven M. Shape; Dennemeyer & Associates, LLC

(57) ABSTRACT

A mower-conditioner for cutting and conditioning crop material, comprises a mower unit for cutting crop material and a conditioner unit that is configured to condition the cut crop material. A drive input is configured to receive a rotational drive from an external drive unit, and a drive transmission system is configured to transmit rotary drive from the drive input to the mower unit and the conditioner unit. The drive transmission system includes a continuously variable transmission (CVT) that transmits rotary drive between the mower unit and the conditioner unit with a variable speed ratio.

8 Claims, 5 Drawing Sheets

(56) References Cited

U.S. PATENT DOCUMENTS

| | | | | |
|---|---|---|---|---|
| 5,901,535 | A * | 5/1999 | Duckinghaus | A01F 29/14 56/10.2 G |
| 6,453,654 | B1 * | 9/2002 | Kraus | A01D 43/10 56/16.4 |
| 6,718,744 | B2 * | 4/2004 | Rosenbalm | A01D 43/10 56/13.9 |
| 7,730,701 | B1 | 6/2010 | Ehrhart et al. | |
| 8,656,694 | B2 * | 2/2014 | Pruitt | A01D 43/105 56/10.6 |
| 2004/0132567 | A1 | 7/2004 | Schonnenbeck | |
| 2014/0102067 | A1 * | 4/2014 | Barnett | A01D 34/71 56/16.4 C |
| 2014/0144116 | A1 * | 5/2014 | Kraus | A01F 29/14 56/10.2 H |
| 2019/0116733 | A1 * | 4/2019 | Wire | A01D 43/085 |

FOREIGN PATENT DOCUMENTS

| | | | |
|---|---|---|---|
| ES | 2114351 | A1 | 5/1998 |
| JP | H1066435 | A | 3/1998 |
| JP | 2009022203 | A | 2/2009 |

\* cited by examiner

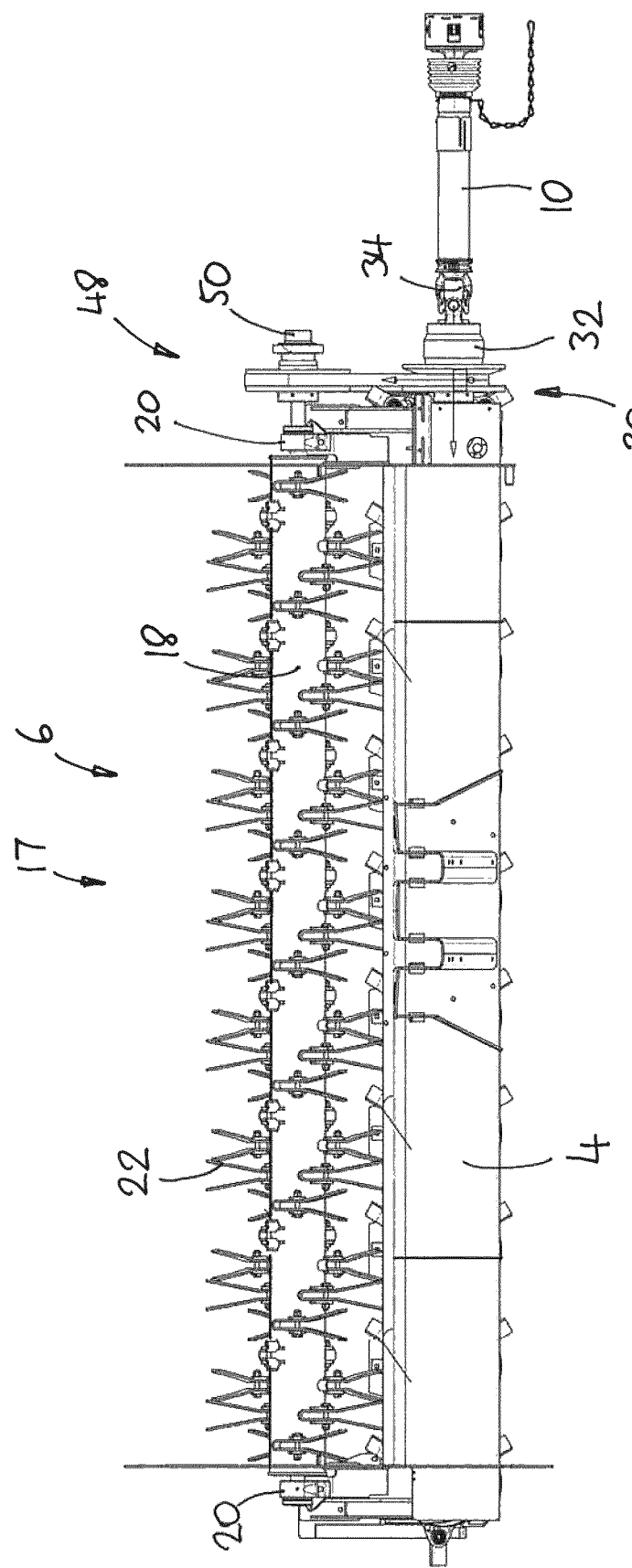

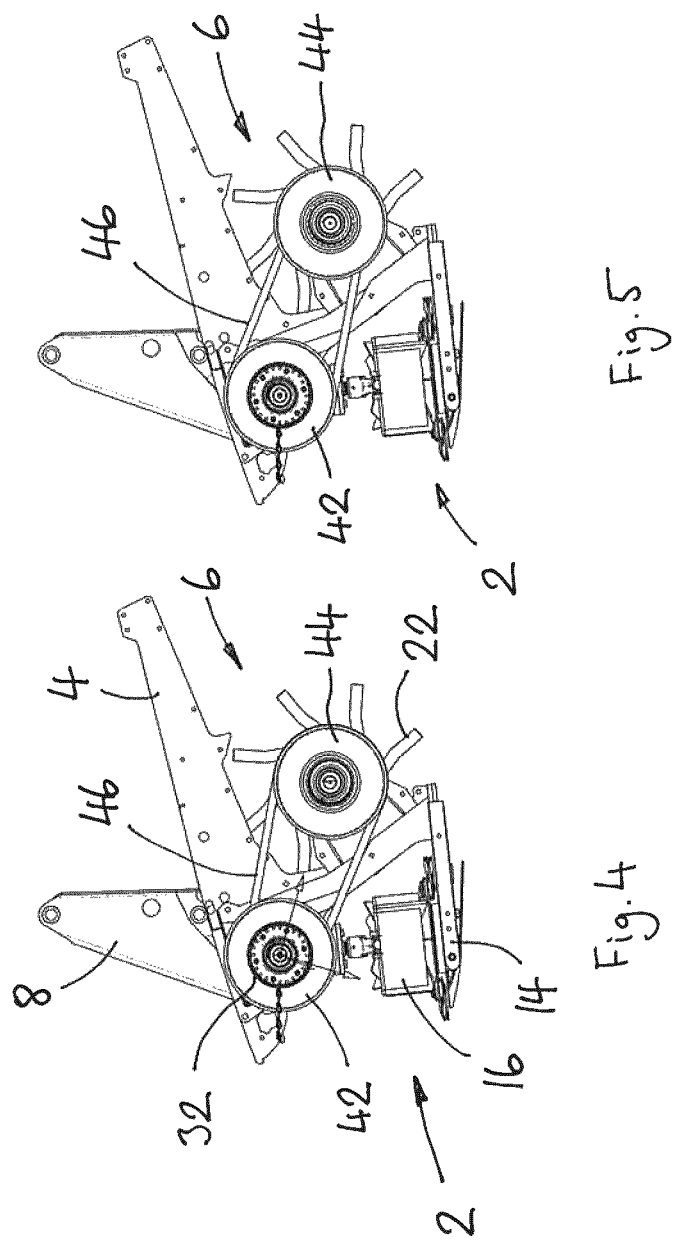

MOWER-CONDITIONER WITH A VARIABLE SPEED RATIO

CROSS-REFERENCE TO RELATED APPLICATIONS

This application is a U.S. National Entry of International Application No. PCT/EP2017/084082 filed Dec. 21, 2017, which claims priority to United Kingdom Application No. GB1705252.3 filed Mar. 31, 2017, which is hereby incorporated by entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The present invention relates to a mower-conditioner device for cutting and conditioning a crop material for use (for example) as fodder or bedding material for animals. In particular, the invention relates to a mower-conditioner comprising a mower unit for cutting a crop material and a conditioner unit for conditioning the cut crop material.

(2) Description of Related Art

When harvesting crop material such as grass or alfalfa for use as fodder it is often beneficial to condition the cut crop material with a conditioner unit that bruises or breaks the stalks of the crop material immediately after cutting. This allows moisture to escape more readily from the cut crop material, promoting rapid drying. The cut crop material is usually then laid on the ground in a swath or windrow while it dries, after which the material may be collected up and formed into bales or stored in bulk for later use. A typical mower-conditioner that comprises a mower unit for cutting a crop material and a conditioner unit for conditioning the cut crop material is described for example in U.S. Pat. No. 5,778,647.

There are two main types of conditioner unit currently in use. The first type is the flail conditioner, comprising a rotor having a shaft that carries a plurality of flail-like conditioning elements, a drive mechanism for driving rotation of the rotor about an axis, and a deflector element or plate having a working surface that surrounds at least part of the circumference of the rotor to define a conditioning passage through which crop material is transported by rotation of the rotor. The flail-like conditioning elements bruise or break the stalks of the crop material as it is transported through the conditioning passage.

The second type is the roller conditioner, which has a pair of contra-rotating rollers, which process the crop material by crushing the material as it passes through the nip between the two rollers. The present invention is designed particularly for use with a flail conditioner, but may also be useful with a roller conditioner.

The drying time required for a particular crop will depend on a number of factors including the type of crop, the moisture content, the ambient weather conditions, the quantity of the crop material and the degree of conditioning. Depending on these and other factors (including for example the weather forecast), it may be desirable to adjust the amount of conditioning to control the drying process.

In some circumstances, it may be desirable to adjust the degree of conditioning continually while harvesting the crop (i.e. during an on-going harvesting process). For example, if the crop has not grown evenly throughout the entire area of a field, it may be desirable to increase the degree of conditioning in some areas of the field (for example where the crop contains more moisture) to improve drying speed, and decrease the amount of conditioning in other areas to improve the energy efficiency of the mower-conditioner. It may also be desirable to adjust the operating speed of the conditioner unit, depending on the quantity of crop growing in different areas of a field, to improve the energy efficiency of the conditioner unit.

By controlling the conditioner unit in this way, the food value and quality of the fodder obtained from the cut crop material can be improved, and the fuel economy of the machine used to cut and condition the crop material can be maximised.

In many mower-conditioners the mower unit and the conditioner unit are driven from the power take off unit of a tractor, for example via a drive shaft. Typically, a gearbox is used to transmit the rotational drive to the mower unit and the conditioner unit. Alternatively, a belt drive is sometimes used to transfer drive from the mower unit to the conditioner unit. In many mower-conditioners the mower unit and the conditioner unit are directly linked to one another and rotate at matched speeds.

In some mower-conditioners a transmission mechanism is provided between the mower unit and the conditioner unit that makes it possible to adjust the relative rotational speeds of the mower unit and the conditioner unit. For example, it is known to provide a two speed gearbox that allows the speed ratio (i.e. the ratio of the mower unit speed to the conditioner unit speed) to be set to two different values. Thus, assuming that the mower unit is driven at a constant speed, the operator can select either a "high speed" setting or a "low speed" setting for the conditioner unit. Alternatively, where a belt drive system is used, it is known to provide a number of interchangeable pulleys, which can be exchanged to provide different drive speed ratios for the mower unit and the conditioner unit.

In each of the known systems described above only a small number of different speed ratios are possible (usually only two), so the choices available to the operator of the mower-conditioner are very limited. Also, it is not normally possible to adjust the speed ratio continually during a harvesting operation. Instead, the appropriate speed ratio for the harvesting operation must be pre-selected. It is not therefore possible to adapt the speed ratio to different conditions in different parts of a field where, for example, the crop may be growing more or less densely, or where it has a higher or lower moisture content.

U.S. Pat. No. 7,730,701 describes a mower-conditioner that comprises a mower unit for cutting a crop material and a conditioner unit for conditioning the cut crop material. The mower unit and the conditioner unit are driven by separate hydraulic drive motors, and a variable flow diverter valve is provided in the hydraulic drive circuit of the conditioner unit, which can be used to control the speed of the conditioner unit. This allows the speed ratio of the mower unit and the conditioner unit to be adjusted, thus mitigating some of the problems indicated above. However, this mechanism is only suitable for use with dedicated mower-conditioner machines with hydraulically driven mower and conditioner units, or mower-conditioners designed for use with tractors that have a suitable hydraulic power supply.

SUMMARY

It is an object of the present invention to provide a mower-conditioner that mitigates one or more of the aforesaid problems. A further object of the invention is to provide a mower-conditioner that mitigates one or more of the aforesaid problems, and that can be driven via a rotary power take off unit.

According to one aspect of the present invention there is provided a mower-conditioner for cutting and conditioning crop material, comprising a mower unit for cutting crop material and a conditioner unit that is configured to condition the cut crop material, a drive input that is configured to receive a rotational drive from an external drive unit, and a drive transmission system that is configured to transmit rotary drive from the drive input to the mower unit and the conditioner unit, wherein the drive transmission system includes a continuously variable transmission (CVT) that transmits rotary drive between the mower unit and the conditioner unit with a variable speed ratio.

The CVT makes it possible to vary the speed ratio of the mower unit and the conditioner unit either continuously (i.e. steplessly) or quasi-continuously (i.e. in small discrete steps). This provides a far greater degree of control over the relative speeds of the mower unit and the conditioner unit, allowing the degree of conditioning to be adjusted. The degree of conditioning can thus be increased where the crop material needs to be dried more quickly (for example, where it contains a large amount of moisture, or where harvesting must be completed rapidly), or it can be decreased where the crop material does not need to be dried quickly, thereby improving the energy efficiency of the conditioner.

The CVT also makes it possible to adjust the speed ratio of the mower unit and the conditioner unit continually (i.e. continuously over time). The speed ratio can thus be adjusted while harvesting the crop (i.e. during an on-going harvesting process). For example, if the crop has not grown evenly throughout the entire area of a field, the degree of conditioning may be increased in some areas of the field (for example where the crop contains more moisture) to improve drying speed, and decreased in other areas to improve the energy efficiency of the mower-conditioner. The operating speed of the conditioner unit may also be adjusted depending on the quantity of crop growing in different areas of a field, to improve the energy efficiency of the conditioner unit. The speed ratio of the mower unit and the conditioner unit may be adjusted either continually, for example in response to an analogue control signal, or quasi-continually (at discrete time intervals), for example in response to a digital control signal.

By controlling the speed ratio in this way, the food value and quality of the fodder obtained from the cut crop material can be improved, and the fuel economy of the machine used to cut and condition the crop material can be maximised.

The drive input is configured to receive a rotational drive from an external drive unit, thus allowing it to be driven from the power take off (PTO) unit of a tractor, for example via a drive shaft.

In a preferred embodiment the drive input is configured to drive the mower unit, and the CVT is configured to transfer drive from the drive input to the conditioner unit. In this configuration the mower unit will normally be driven at a constant speed, which is set by the speed of the PTO, and the speed of the conditioner unit will be variable and controlled by the speed ratio of the CVT. Alternatively, the drive input may be configured to drive the conditioner unit and the CVT may be configured to transfer drive from the drive input to the mower unit.

In a preferred embodiment the CVT comprises a variable-diameter pulley CVT, comprising for example a variable-diameter input pulley, a variable-diameter output pulley, and a flexible drive element that extends around the pulleys. This type of CVT is relatively simple, reliable and efficient, and is capable of transmitting high torque values. The flexible drive element may be a drive belt or a drive chain. Different kinds of CVT may also be used including, for example, a toroidal CVT or a hydrostatic CVT mechanism.

Advantageously, the CVT includes an adjuster mechanism for adjusting the speed ratio of the CVT. The adjuster mechanism may include at least one actuator for adjusting the speed ratio of the CVT, allowing the speed ratio to be adjusted remotely and/or during operation of the mower-conditioner.

The mower-conditioner may include a control system for controlling operation of the actuator. In an embodiment the control system includes a sensor (i.e. at least one sensor) that senses at least one operational condition of the mower-conditioner and a control unit that receives a sensor signal from the sensor and controls operation of the actuator so as to adjust the speed ratio of the CVT in response to said sensor signal.

In an embodiment the sensor is configured to sense at least one operational condition selected from the range comprising a force exerted by the cut crop material on a component of the conditioner unit (for example the deflector plate), a flow rate of cut crop material through the conditioner unit, and the rotational torque, speed or power delivered to the mower unit and/or the conditioner unit.

In an embodiment the control system is configured for automatic control of the CVT, thus ensuring that the speed ratio is always at an optimum value. Alternatively or in addition the control system may be configured to enable operator control of the CVT. The adjuster mechanism may include a manual adjuster for adjusting the speed ratio of the CVT.

In an embodiment the mower unit comprises a plurality of rotary cutter elements, e.g. cutter discs and/or cutter drums. Alternatively, the mower unit may include a sickle bar type cutter element.

In an embodiment the conditioner unit is a flail-type conditioner, and comprises a rotor having a shaft that carries a plurality of conditioning elements, a deflector element having a working surface that surrounds at least part of the circumference of the rotor to define a conditioning passage through which crop material is transported by rotation of the rotor. The conditioning elements may comprise flail elements pivotally attached to the shaft of the rotor. Alternatively, the conditioner unit may be a roller-type conditioner.

In an embodiment the mower-conditioner is configured to be attached to a tractor with the drive input connected to receive rotational drive from a power take off of the tractor. Alternatively, the mower-conditioner may be part of a dedicated mower-conditioner machine comprising the mower-conditioner and a wheeled vehicle that carries the mower-conditioner.

BRIEF DESCRIPTION OF THE DRAWINGS

An embodiment of the invention will now be described, by way of example, with reference to the accompanying drawings, wherein:

FIG. 3 is a top plan view of the mower-conditioner;

FIG. 4 is an end view of the mower-conditioner, with the conditioner unit in a first operational configuration;

FIG. 5 is an end view of the mower-conditioner, with the conditioner unit in a second operational configuration.

DETAILED DESCRIPTION

Figure 1:
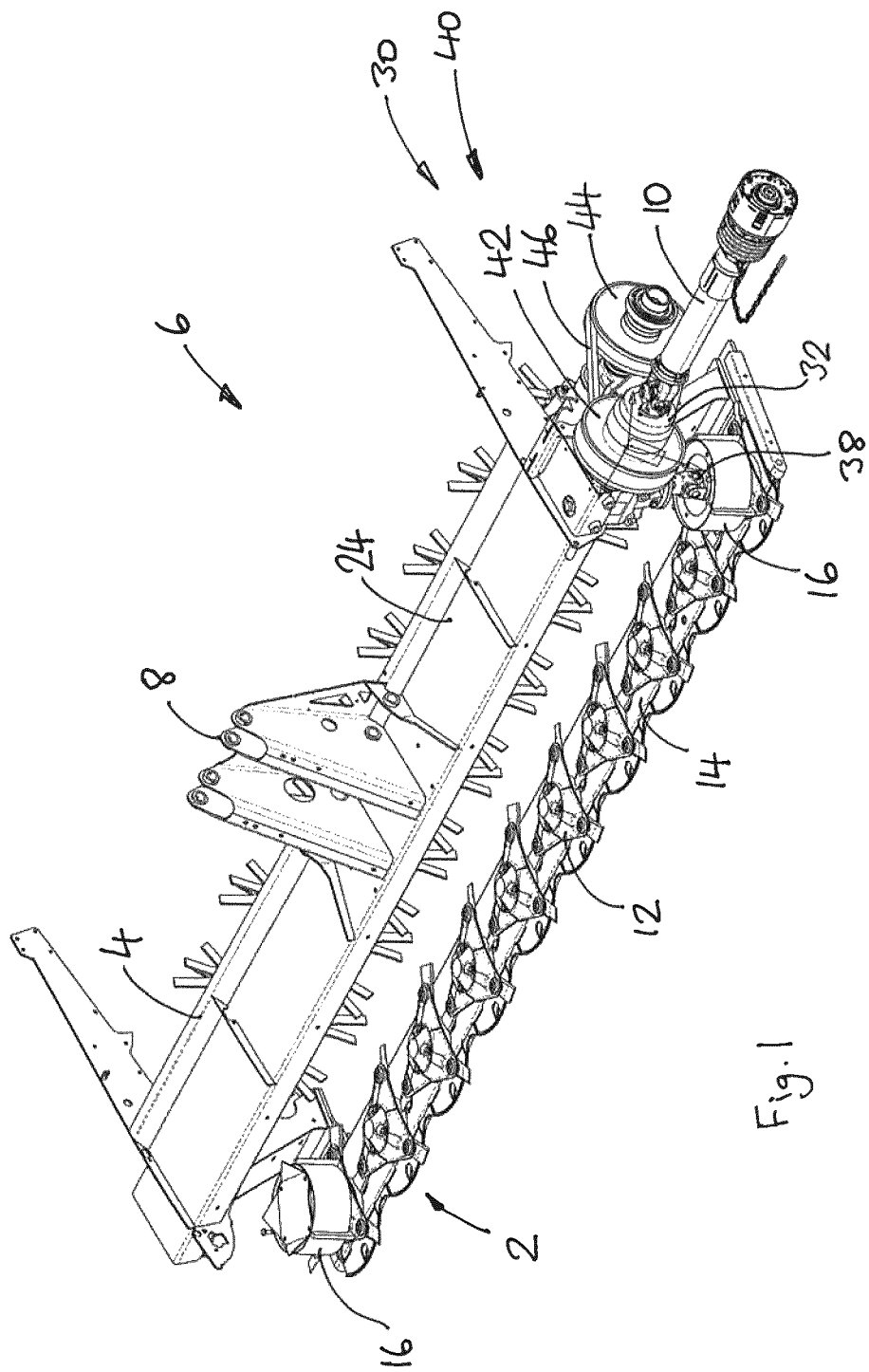
FIG. 1 is an isometric view of a mower-conditioner according to an embodiment of the invention, with the cover removed.
Figure 2:
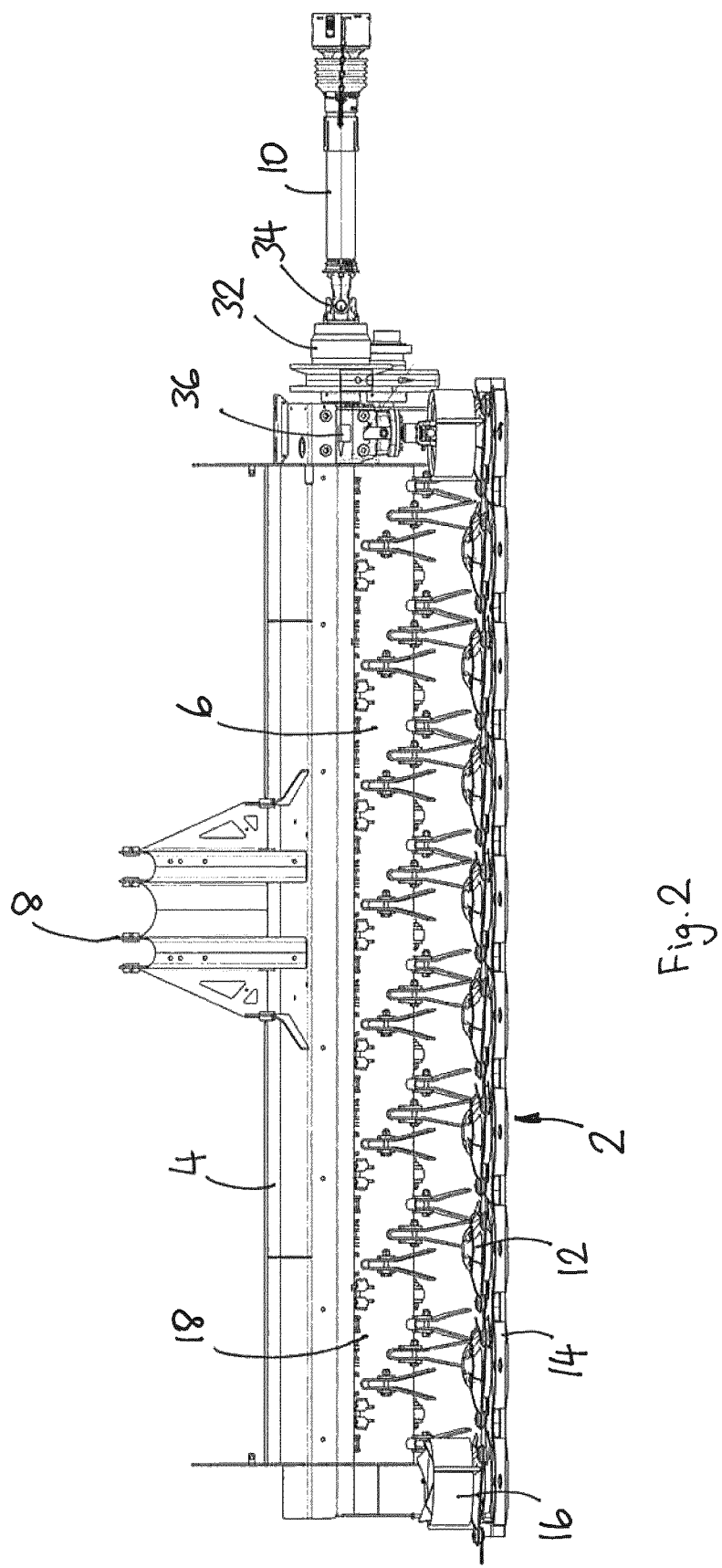
FIG. 2 is a rear view of the mower-conditioner.

The mower-conditioner shown in FIGS. 1-5 includes a mower unit 2, support frame 4 and a conditioner unit 6. Normally, these components would be covered by a flexible cover, which contains the cut crop material as it is processed by the mower-conditioner, and prevents stones and other objects struck by the mower unit from flying off. In the drawings the cover has been removed to show the internal components.

In this embodiment the frame 4 includes a support structure 8 that allows it to be attached to a support arm or other support mechanism of a tractor. The mower-conditioner also includes a drive input shaft 10 that takes a rotary drive for example from the power take off unit of a tractor, in order to drive the mower unit 2 and a conditioner unit 6. Alternatively, the mower-conditioner may be part of a dedicated mower-conditioner machine.

The mower unit 2 is conventional and includes in this embodiment a plurality of rotary cutter disks 12 that are supported by a cutter bar 14. The cutter bar 14 contains a drive mechanism (not shown) for transmitting drive from the drive shaft 10 to the cutter disks. The mower unit 2 also includes a cylindrical cutter drum 16 at each end of the cutter bar, which help to guide cut crop material to the conditioning unit 6.

The conditioner unit 6 includes a transportation rotor 17 comprising a rotary shaft 18 that is supported in rotary bearings 20 at each end of the frame 4. The shaft 18 carries a plurality of finger-like flail elements 22 that are pivotally attached to the shaft 18 and swing outwards as the shaft rotates owing to the centrifugal effect. The tips of the flail elements 22 define the outer circumference of the rotor 17.

The conditioner unit 6 also comprises a deflector plate 24 which in this embodiment is located above and slightly in front of the transportation rotor 17. The lower surface of the deflector plate 24 comprises a working surface, which together with the outer circumference of the transportation rotor 17 defines a conditioning channel through which the cut crop material passes. As the cut crop material passes through the conditioning channel it is conditioned by being worked between the tips of the rotating flail elements 22 and the working surface of the deflector plate 24. The working surface of the deflector plate 24 may be ridged, profiled or textured to aid the conditioning process. The features described above are all conventional and they will not therefore be described in further detail.

In this embodiment of the invention the transportation rotor 17 is configured to operate in an overshoot mode, in which the front part of the rotor rotates upwards and the cut crop material passes over the shaft 18 of the rotor 17. In this configuration the deflector plate 24 is located above the rotor 17 so that the cut crop material is conditioned as it passes over the rotor. It should be understood however that the conditioner unit may alternatively be configured to operate in an undershoot mode, in which the rotor rotates in the opposite direction and the cut crop material passes beneath the shaft 18 of the rotor. In this configuration the deflector plate will be located below the rotor 17 to condition the crop material as it passes beneath the shaft of the rotor.

Optionally, the deflector plate 24 may attached to the frame 4 by an adjusting mechanism that allows the position of the deflector plate 24 to be adjusted relative to the rotor 17, thereby allowing the shape of the conditioning channel to be adjusted, so as to control the feed rate of cut crop material through the channel and the degree of conditioning. Such a mechanism is described for example in our patent application GB2560997A.

The mower unit 2 and the conditioner unit 6 are both driven from the power take off unit of a tractor or agricultural vehicle via the input drive shaft 10. Rotary drive is transmitted from the drive shaft 10 to the mower unit 2 and the conditioner unit 6 via a transmission system 30. The transmission system 30 includes a drive input hub 32 that is connected to the input drive shaft 10 via a universal joint 34. The hub 32 is connected to the mower unit 2 through a bevel gearbox 36 having an output shaft 38 that is substantially perpendicular to the rotational axis of the hub 32. The output shaft 32 is connected to one of the cylindrical cutter drums 16, and drive is transmitted from that cutter drum 16 to the rotary cutter discs 12 and the other cylindrical cutter drums 16 via the drive mechanism in the cutter bar 14.

Drive is transmitted from the input hub 32 to the conditioner unit 6 via a continuously variable transmission (CVT) 40. In this embodiment the CVT 40 is of the variable diameter pulley (VDP) type and comprises an input pulley 42, an output pulley 44 and a flexible drive element comprising a V-shaped drive belt 46 that transmits drive from the input pulley 42 to the output pulley 44.

The input and output pulleys 42,44 are both split perpendicular to their rotational axes, providing two sheaves having conical inner faces that provide drive surfaces for the V-shaped drive belt 46. The spacing between the sheaves is adjustable to increase or decrease the effective diameter of each pulley. An adjusting mechanism 48 is provided to adjust both pulleys simultaneously in opposite directions (so that the effective diameter of one pulley increases as the other decreases), in order to maintain the tension in the drive belt 46. The speed ratio of the input and output pulleys 42, 44 is thus continuously adjustable.

Two operational configurations of the CVT are illustrated in FIGS. 4 and 5. In FIG. 4 the sheaves of the input pulley 42 are separated to provide a relatively small drive diameter and the sheaves of the output pulley 44 are close together to provide a large pulley diameter. The CVT is thus configured to provide a relatively low conditioner speed, compared to the mower speed (where the speed ratio of mower speed/conditioner speed is >1). In FIG. 5 the sheaves of the input pulley 42 are close together to provide a relatively large drive diameter and the sheaves of the output pulley 44 are separated to provide a small pulley diameter. The CVT is thus configured to provide a relatively high conditioner speed, compared to the mower speed (where the speed ratio of mower speed/conditioner speed is <1).

The adjusting mechanism 48 for adjusting the speed ratio of the CVT may be controlled by an actuator 50, for example an electric actuator or a hydraulic actuator. This allows the speed ratio of the CVT to be adjusted remotely, for example by the operator, or automatically by a control system. In this case it is possible to adjust the speed ratio of the CVT continually while the mower-conditioner is operating. Alternatively, the adjusting mechanism may be manually adjustable, in which case the speed ratio must be set in advance.

Figure 6:
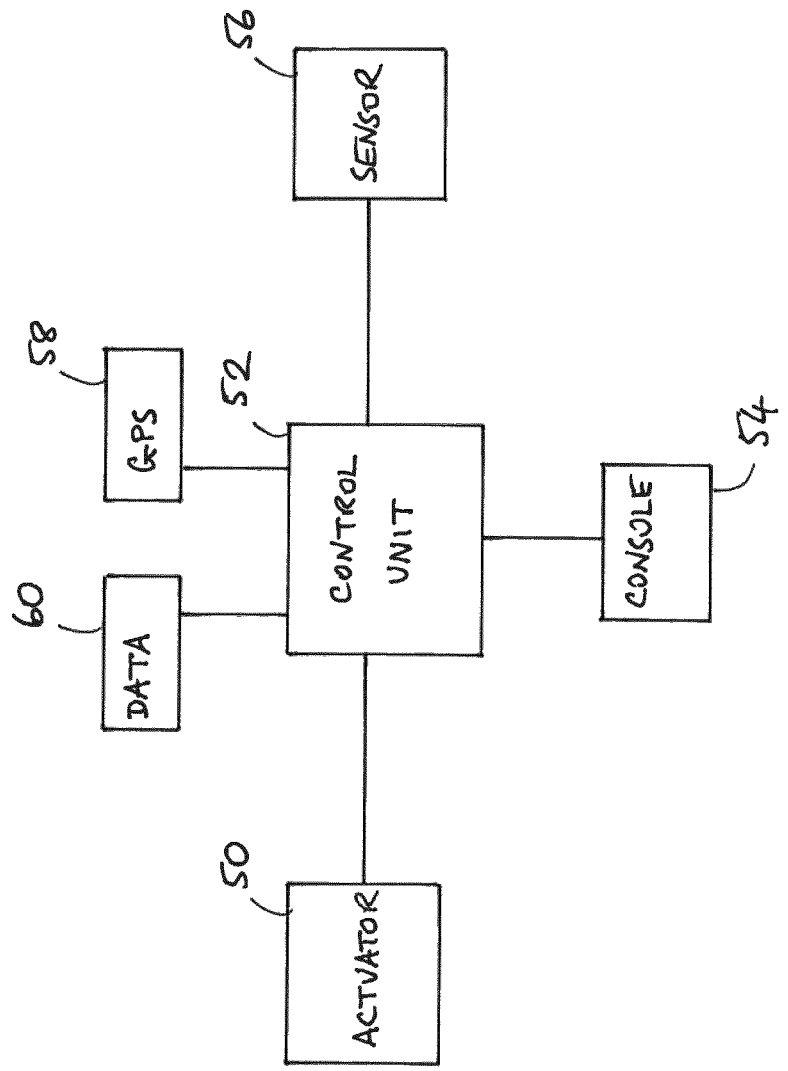
FIG. 6 is a schematic diagram of a control system for the mower-conditioner.

A control system for controlling operation of the CVT is illustrated schematically in FIG. 6. The control system includes a control unit 52 that is connected to the CVT actuator 50 and sends control signals to the actuator to control operation of the actuator. The control unit may be connected to an operator control console, allowing a human operator to enter input signals that control operation of the control unit 52. One or more sensors 56 may be connected to the control unit and configured to send sensor signals to the control unit 52, which the control unit then analyses to assess the appropriate speed ratio setting for the CVT 40. These sensors may sense various variable factors including for example the pressure exerted on the deflector plate 24 by the cut crop material as it passes through the conditioner unit, the flow rate of cut crop material, the torque transmitted to the mower unit and/or the conditioner unit, or various other factors.

Optionally, the control system may include a GPS unit 58 and/or a data store 60 that contains geographical data including for example the soil type, elevation, slope and water content in different parts of an agricultural field. The GPS data from the GPS unit 58 and the geographical data held in the data store may be used by the control unit 52 to assess the level of conditioning require in different parts of the field and adjust the actuator 50 accordingly.

The CVT described above may alternatively have one or more different configurations. For example, the drive shaft 10 may be connected to drive the conditioning unit directly, with torque transmitted to the mower unit via the CVT 40. Various different types of VDP CVT may also be used. For example, the drive belt 46 may be replaced by a drive chain. Alternatively, different kinds of CVT may be used, including for example a toroidal CVT or a hydrostatic CVT mechanism.

The mower-conditioner may be configured to have a number of different operational modes, including one or more of the following:

Manual (Pre-Set) Operation

In this mode the speed ratio of the mower unit and the conditioner unit are set in advance according to prevailing conditions, including for example the density of the crop growing in the field, the moisture content of the crop, the operating speed of the tractor and weather conditions (both present and forecast). This requires only a manual adjusting mechanism for adjusting the speed ratio of the variable transmission, for example comprising levers or screw adjusters. One or more actuators can also be used to pre-set the speed ratio of the variable transmission.

Operator Controlled (with Continual Adjustment)

Where the variable transmission includes one or more actuators 50 that can be adjusted remotely, this allows for the possibility of continually adjusting the speed ratio of the variable transmission using in-cab controls 54 during an on-going conditioning operation. The operator can then adjust the speed ratio to control the feed rate and/or the degree of conditioning according to growing conditions in different parts of a field. For example, the degree of conditioning can be increased in areas of a field where the crop contains more moisture, and the feed rate can be increased in areas of the field where the crop is growing more densely.

Automatic Operation

To operate in automatic mode the mower-conditioner may include one or more sensors 56 that are able to sense factors indicative of the current state of operation of the mower-conditioner. These sensors may for example sense variables such as the pressure exerted on the deflector plate 24 by the cut crop material as it passes through the conditioner unit, the flow rate of cut crop material, the torque transmitted to the mower unit and/or the conditioner unit, the torque and/or rotational speed of the input drive shaft, or various other factors.

The mower-conditioner may include a control unit 52 that receives signals from the sensors 56 and sends control signals to the actuator 50 of the adjusting mechanism 48 in order to adjust the speed ratio of the CVT according to the received signals. The speed ratio of the CVT may be adjusted continuously so as to control both the feed rate of the crop material to the conditioner unit and the degree of conditioning.

Various other factors may also be controlled which may affect operation of the mower-conditioner. These other factors may include, for example the height of the mower unit, the angle of the cutter bar, and various other factors. The control unit 52 may be configured to take these other variable factors into account and to control the speed ratio of the CVT in order to provide an appropriate degree of conditioning to the cut crop material.

In addition, the control unit 52 may be programmed to receive geographical position data, for example from a GPS unit 58, and use mapping information from a database 60 to adjust the speed ratio of the CVT according to known variations in growing conditions within a particular geographical area, such as an agricultural field. By this method, the degree of conditioning can be adjusted automatically to take account of factors that affect the growing conditions within a field, such as variations in water availability, sunlight, soil type and so on. Such a system is particularly applicable to robotic (driverless) agricultural machines, while also being of use in conventional driver-operated machines.

The invention claimed is:

1. A mower-conditioner for cutting and conditioning crop material, comprising a mower unit for cutting crop material and a conditioner unit that is configured to condition the cut crop material, a drive input that is configured to receive a rotational drive from an external drive unit, and a drive transmission system that is configured to transmit rotary drive from the drive input to the mower unit and the conditioner unit, wherein the drive transmission system includes a continuously variable transmission (CVT) that transmits rotary drive between the mower unit and the conditioner unit with a variable speed ratio, wherein the CVT includes an adjuster mechanism that includes at least one actuator for adjusting the speed ratio of the CVT; further comprising a control system for controlling operation of the actuator, wherein the control system includes a sensor that senses at least one operational condition during operation of the mower-conditioner, wherein said at least one operational condition is selected from the range comprising a force exerted by the cut crop material on a component of the conditioner unit, a flow rate of cut crop material through the conditioner unit, and the rotational torque, speed or power delivered to the mower unit and/or the conditioner unit, and a control unit that receives a sensor signal from the sensor and controls operation of the actuator so as to adjust the speed ratio of the CVT continually during operation of the mower-conditioner in response to said sensor signal.

2. The mower-conditioner according to claim 1, wherein the drive input is configured to drive the mower unit and the CVT is configured to transfer drive from the drive input to the conditioner unit.

3. The mower-conditioner according to claim 1, wherein the CVT comprises a variable-diameter pulley CVT.

4. The mower-conditioner according to claim 1, wherein the control system is configured to enable operator control of the CVT.

5. The mower-conditioner unit according to claim 1, wherein the mower unit comprises a plurality of rotary cutter elements.

6. The mower-conditioner according to claim 1, wherein the conditioner unit comprises a rotor having a shaft that carries a plurality of conditioning elements, a deflector element having a working surface that surrounds at least part of the circumference of the rotor to define a conditioning passage through which crop material is transported by rotation of the rotor.

7. The mower-conditioner according to claim 6, wherein the conditioning elements comprise flail elements pivotally attached to the shaft of the rotor.

8. The mower-conditioner according to claim 1, wherein the mower-conditioner is configured to be attached to a tractor with the drive input connected to receive rotational drive from a power take off of the tractor.

* * * * *